United States Patent
Clay

(10) Patent No.: US 10,279,732 B2
(45) Date of Patent: May 7, 2019

(54) HUMANOID PROFILE SAFETY SIGN

(71) Applicant: Silhouette Safety Signs, LLC, Phoenix, AZ (US)

(72) Inventor: Alexander Clay, Phoenix, AZ (US)

(73) Assignee: Silhouette Safety Signs, LLC, Phoenix, AZ (US)

( * ) Notice: Subject to any disclaimer, the term of this patent is extended or adjusted under 35 U.S.C. 154(b) by 0 days.

(21) Appl. No.: 15/455,533

(22) Filed: Mar. 10, 2017

(65) Prior Publication Data

US 2018/0201183 A1    Jul. 19, 2018

Related U.S. Application Data

(60) Provisional application No. 62/306,908, filed on Mar. 11, 2016.

(51) Int. Cl.
| | | |
|---|---|---|
| *B60Q 1/46* | (2006.01) | |
| *G09F 7/18* | (2006.01) | |
| *G09F 19/08* | (2006.01) | |
| *G09F 21/04* | (2006.01) | |
| *G09F 13/18* | (2006.01) | |

(52) U.S. Cl.
CPC ............. *B60Q 1/46* (2013.01); *G09F 7/18* (2013.01); *G09F 19/08* (2013.01); *G09F 21/04* (2013.01); *G09F 13/18* (2013.01); *G09F 2007/1865* (2013.01)

(58) Field of Classification Search
CPC .......... G09F 13/00; G09F 13/16; G09F 13/18; G09F 13/20; G09F 13/22; G09F 13/222; G09F 15/0006; G09F 15/0056; G09F 15/0062; G09F 2007/1856; G09F 2007/1865; B60Q 7/00; B60Q 1/2619–1/2638; B60Q 1/2696
USPC ...................... 340/471–473, 908, 908.1, 433
See application file for complete search history.

(56) References Cited

U.S. PATENT DOCUMENTS

| | | | | |
|---|---|---|---|---|
| 3,886,519 A * | 5/1975 | Hovland | .................. | E01F 13/06 116/63 P |
| 4,325,318 A * | 4/1982 | Kitrell | ...................... | B60Q 1/52 116/63 T |
| 5,001,475 A * | 3/1991 | Scovin | ...................... | G08G 1/07 116/63 P |
| 5,023,607 A * | 6/1991 | Staten | .................... | G08B 5/006 340/908.1 |
| 5,682,150 A * | 10/1997 | Votava | .................... | B61L 5/125 340/473 |
| 6,052,067 A * | 4/2000 | Nuxoll | ................. | G08G 1/0955 340/908 |
| 6,169,477 B1 * | 1/2001 | Fiato | ........................ | E01F 9/70 116/63 P |
| 6,448,905 B1 * | 9/2002 | Jones | .................... | G08G 1/0965 116/63 P |
| 6,579,035 B1 * | 6/2003 | Watson | ................... | E01F 9/559 404/12 |
| 2014/0169019 A1 * | 6/2014 | Fulton | .................... | B60R 21/34 362/516 |
| 2015/0023009 A1 * | 1/2015 | White | .................... | G09F 21/04 40/591 |

* cited by examiner

*Primary Examiner* — James J Yang
(74) *Attorney, Agent, or Firm* — KW Law, LLP

(57) ABSTRACT

Systems, devices, and methods for deploying a safety sign from a vehicle are provided. The systems and devices include a safety sign with a humanoid profile that may be conveniently and reversibly deployed from a vehicle.

14 Claims, 8 Drawing Sheets

HUMANOID PROFILE SAFETY SIGN

CROSS REFERENCE TO RELATED APPLICATIONS

This application claims priority to U.S. Provisional Application No. 62/306,908, entitled "HUMANOID PROFILE SAFETY SIGN" filed on Mar. 11, 2016, the entire contents of which are herein incorporated by reference.

FIELD

The present disclosure relates to devices, systems and methods for deploying a sign with a humanoid profile, and more specifically, devices, systems and methods for deploying a sign with a humanoid profile from a vehicle as safety signage to increase awareness by others of potential presence of a person in the vicinity of the vehicle to which the sign is mounted.

BACKGROUND

Truck drivers and other persons working around a stopped truck or other vehicle are often at risk from hazards posed by other vehicles operating in the area, including regular vehicle traffic, construction vehicle traffic, cargo-unloading vehicle traffic, and the like. The risk posed by other vehicular traffic can further cause a person outside of a vehicle to place themselves in positions intended to reduce their exposure to the risks posed by other vehicles but may increase their exposure to other risks. These other risks can include operating on top of a stopped vehicle or the cargo load on the vehicle, for example, during securing a cargo load or unloading cargo, with the increased risks associated with climbing and falling from an increased height. Typical safety measures used around stopped trucks or other vehicles often include movable pylons (also referred to as traffic cones) or other temporary signs placed on the ground. These types of safety measures are generally low in height. For example, a common traffic cone height is about 28 inches. Safety measures placed on the ground or located near ground level around a stopped vehicle are unlikely to sufficiently raise the awareness of nearby vehicle operators to the potential presence of a person around the outside of the stopped vehicle. Moreover, nearby vehicle operators may generally be desensitized to the configurations of many typical safety measures such as cones or signs. Human safety measures such as flaggers are sometimes employed in high activity, high risk situations, and nearby vehicle operators may be more likely to respond appropriately to the presence of a human operator. While use of a human flagger may provide an increased response in nearby vehicle operators, it also poses a high risk to the flagger. Systems and methods of producing increased nearby vehicle operator awareness of the potential presence of a person around the outside of a stopped vehicle are desirable.

The present disclosure provides systems and methods of deploying a humanoid profile safety sign from a stopped vehicle, thereby increasing nearby vehicle operator awareness of the potential presence of a person in the vicinity of the stopped vehicle.

SUMMARY

In various embodiments, a safety sign system is provided. A safety sign system can comprise a safety sign, a support arm, an attachment component, a support arm bracket configured to receive the support arm, and a support arm pin configured to secure the support arm to the support arm bracket. The safety sign can comprise a humanoid profile. The support arm can comprise a tube with walls defining a rectangular cross section and elongated slots in opposing walls, with the elongated slots configured to receive the attachment component. A safety sign can comprise a first sign portion and a second sign portion. The first sign portion can be coupled to the second sign portion. The first sign portion and the second sign portion can be coupled with a hinge, wherein operation of the hinge can reversibly produce a change of sign configuration between a first sign configuration and a second sign configuration. The safety sign can be reversibly secured in one of the first sign configuration and the second sign configuration. A humanoid profile safety sign can comprise an anterior-posterior view of a human head and torso.

A safety sign can comprise a reflective surface feature. A reflective surface feature can be one of a wide angle prismatic lens reflective sheeting and a glass bead lens. A safety sign can comprise a plurality of reflective surface features. A plurality of reflective surface features can comprise two or more colors. A safety sign can comprise an LED light source.

A safety sign system can comprise a support arm bracket selected from a plurality of interchangeable support arm brackets. A support arm bracket can be configured to be one of permanently or removably attached to a vehicle. A plurality of interchangeable support arm brackets can be configured to provide for attachment to a vehicle by an attachment method selected from the group consisting of welding, bolting, and tool-less insertion.

In various embodiments, a safety sign can comprise a first sign portion, a second sign portion, and a hinge configured to operatively couple the first sign portion and the second sign portion. Operation of the hinge can reversibly produce a change of sign configuration between a first sign configuration and a second sign configuration. A safety sign can comprise a humanoid profile in one of the first sign configuration and the second sign configuration. A safety sign can comprise a clasp configured to reversibly secure the safety sign in one of the first sign configuration and the second sign configuration. A safety sign can comprise one of a reflective surface feature and an LED light source.

In various embodiments, a method of deploying a humanoid profile safety sign system is provided. A method of deploying a humanoid safety sign system can comprise operating a safety sign from a first sign configuration to a second sign configuration, securing the safety sign to a support arm, and securing the support arm to a support arm bracket. A method of deploying a humanoid profile safety sign system can further comprise attaching the support arm bracket to a vehicle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "humanoid" means having at least a portion of the form of human being in shape, including, for example, a head and torso. As used herein, the term "humanoid" can include objects that may only loosely resemble or suggest a human form.

As used herein, the term "profile" means the outline of an object, such as the outline of an object from a side or elevation view.

Figure 1A:
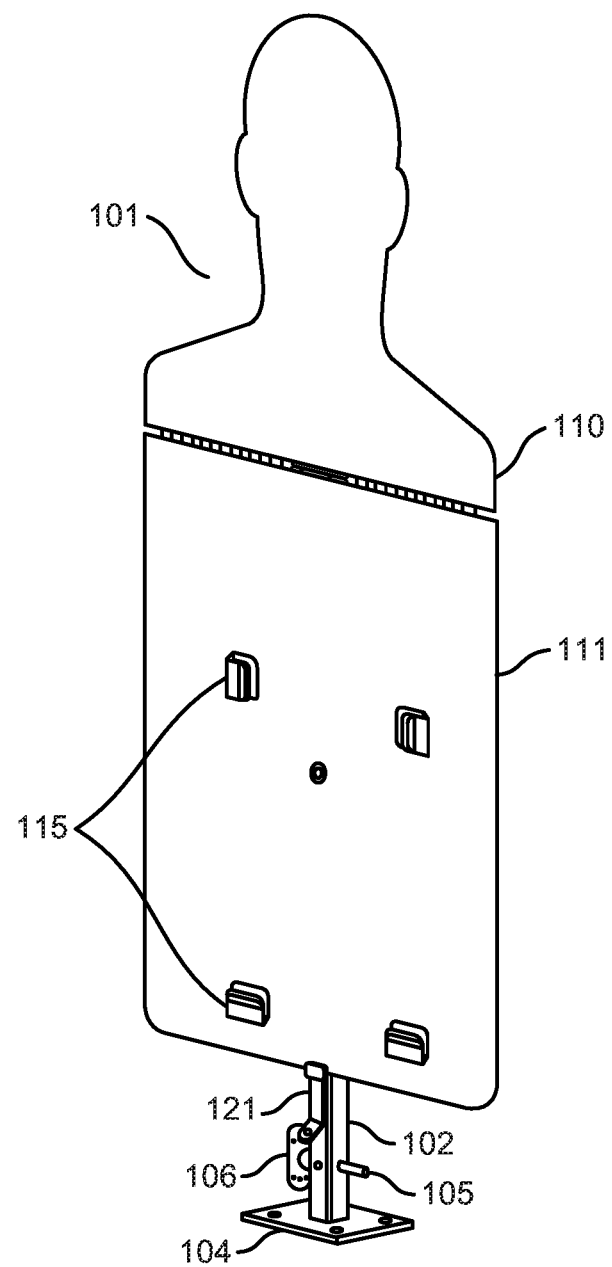
FIG. 1A illustrates a front perspective view of a system in accordance with various embodiments of the present disclosure.
Figure 1B:
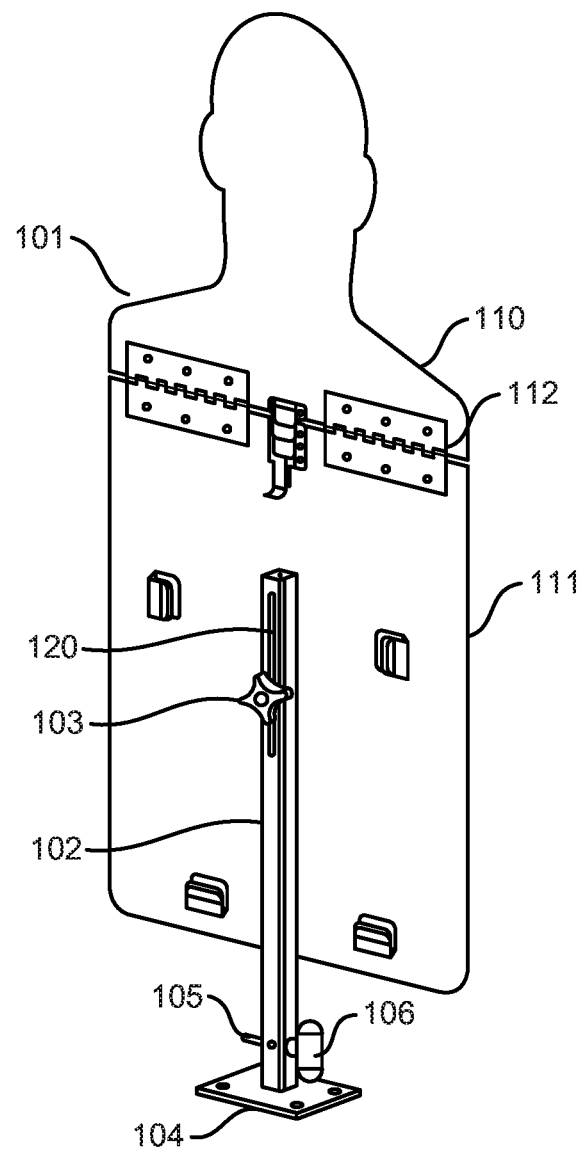
FIG. 1B illustrates a rear perspective view of a system in accordance with various embodiments of the present disclosure.
Figure 1C:
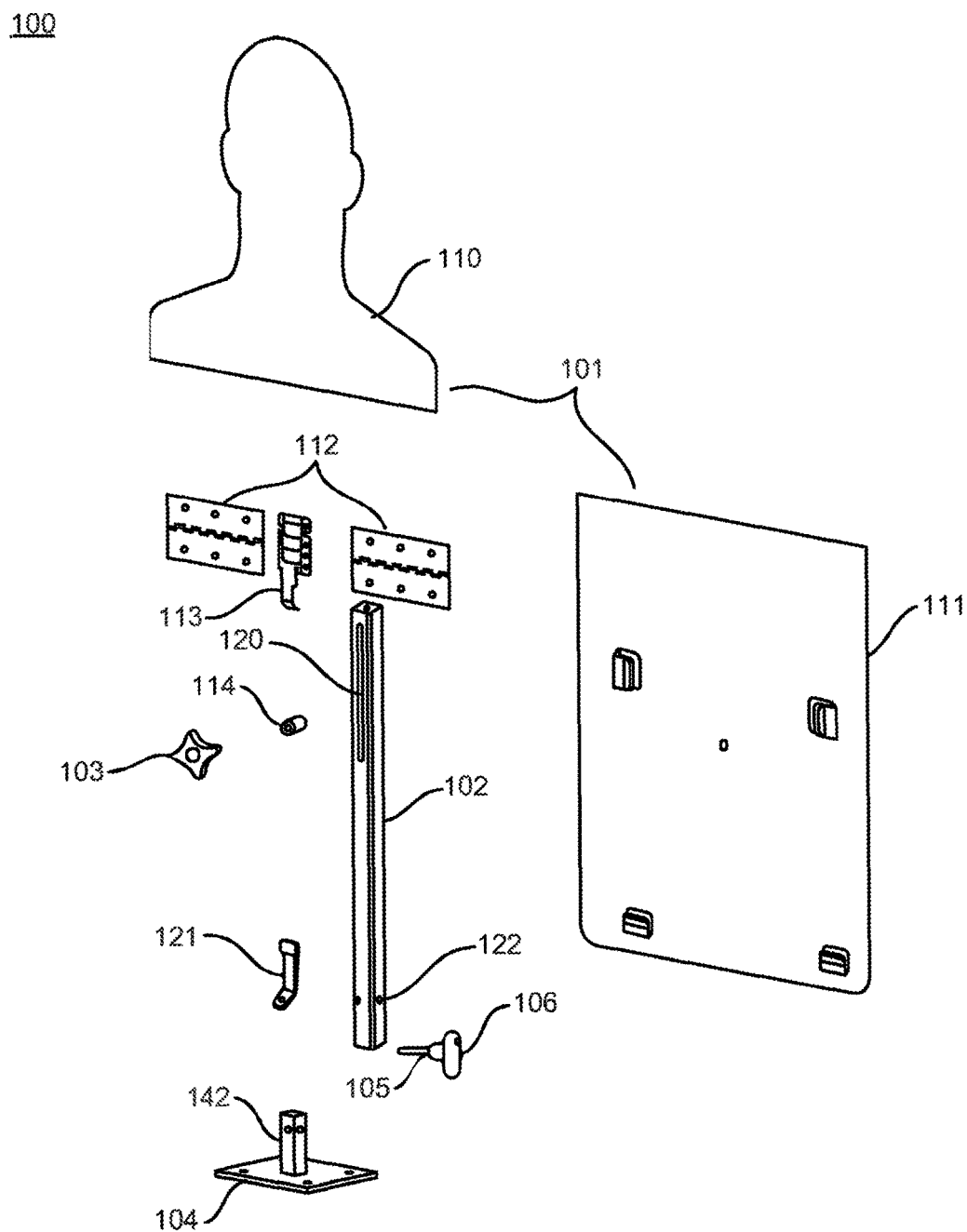
FIG. 1C illustrates an exploded view of a system in accordance with various embodiments of the present disclosure.

With reference now to FIGS. 1A-1C, views of a safety sign system 100 in accordance with various embodiments is shown. A safety sign system 100 can comprise a humanoid profile safety sign 101, a support arm 102, an attachment component 103, and a support arm bracket 104. A safety sign system 100 can also comprise a support arm pin 105 configured to secure the support arm 102 to the attachment portion 142 of support arm bracket 104, such as by insertion through aligned apertures in both components. Support arm pin 105 may have an ergonomic handle 106 attached to an end of the pin for convenient handling and system deployment by a safety sign system operator.

Figure 6:
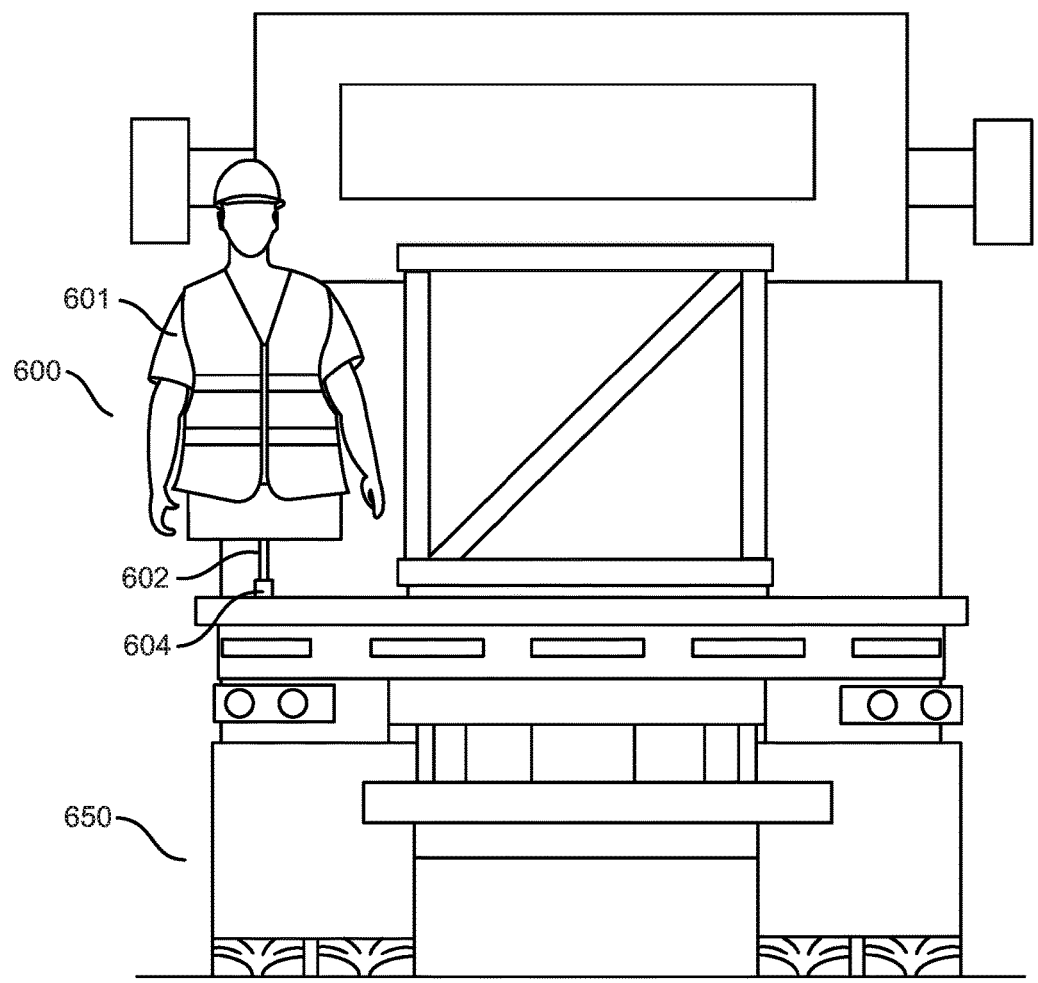
FIG. 6 illustrates a system in accordance with various embodiments of the present disclosure in use.
Figure 7:
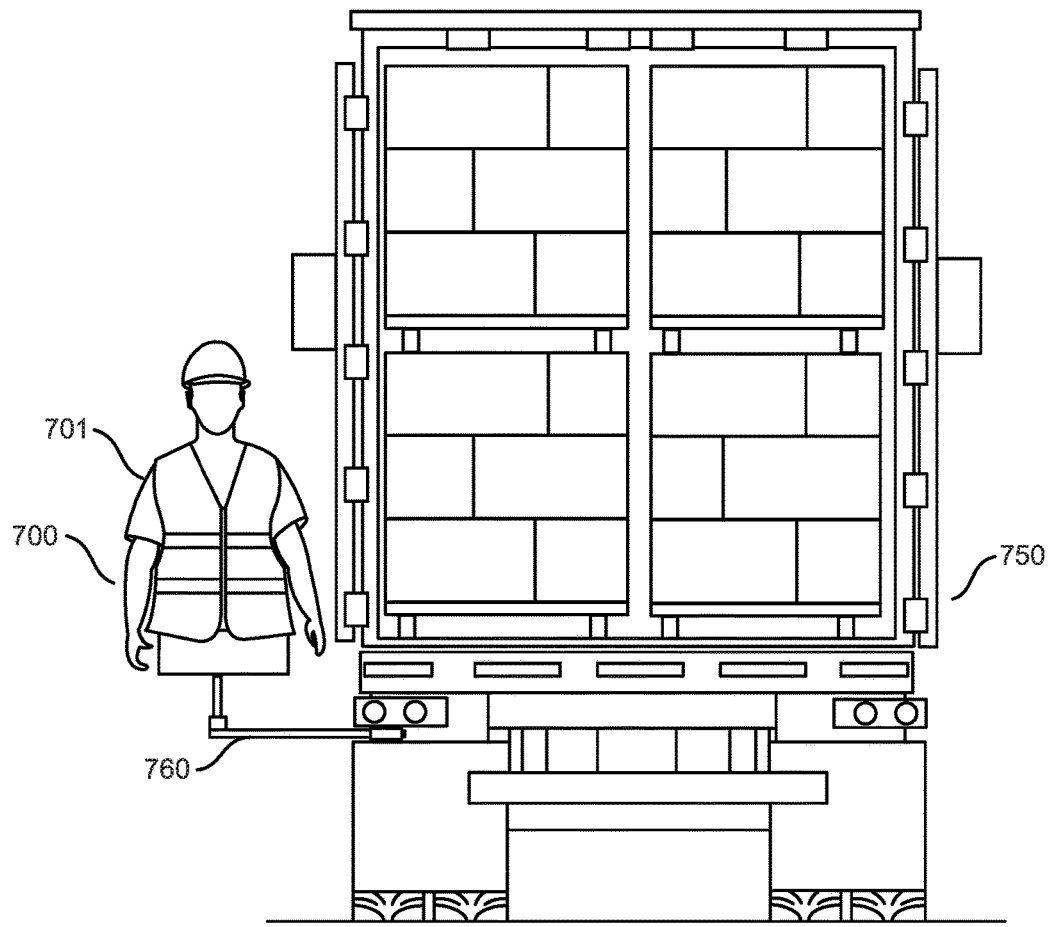
FIG. 7 illustrates a system in accordance with various embodiments of the present disclosure in use.

In various embodiments, a humanoid profile safety sign can comprise a profile of an anterior-posterior view of a human or a portion thereof, such as a human head and torso. A humanoid profile safety sign can similarly comprise profiles representing other views of a human and/or other portions of a human. For example, a humanoid profile safety sign in accordance with various embodiments can comprise a side view of a human, and/or can include in the profile the arms and/or legs of a human. For example, and with reference briefly to FIGS. 6 and 7, sign systems 600 and 700 each comprise a humanoid profile safety sign that includes the arms of a human in addition to the head and torso to provide a sign that more closely resembles a human figure.

A safety sign system in accordance with various embodiments of the present disclosure need not comprise a humanoid profile safety sign. Instead, in various embodiments, a safety sign system can comprise a safety sign configured in various geometric shapes, such as a square shape, a rectangular shape, a diamond shape, a triangular shape, a circular shape, an elliptical shape, and the like. In various embodiments, a safety sign system can comprise a safety sign having an irregular, non-humanoid profile. Any of a variety of safety sign shapes and configurations suitable to attract the attention of a nearby vehicle operator may be used in a safety sign system in accordance with the present disclosure.

In various embodiments, a safety sign can comprise multiple sign portions that may be operatively attached to one another, such as a first sign portion and a second sign portion. For example, humanoid profile safety sign 101 can comprise a first sign portion 110 and a second sign portion 111. In various embodiments, first sign portion 110 can be operatively attached to second sign portion 111, such as with one or more hinges 112. Operation of hinges 112 can reversibly produce a change of sign configuration between a first sign configuration, such as a folded sign configuration, and a second sign configuration, such as an open sign configuration ready for safety sign deployment. A clasp assembly 113 or similar securing mechanism may be used to reversibly secure humanoid profile safety sign 101 in a particular configuration such as the second, open sign configuration. Other attachment mechanisms and/or securing means may be used to operatively attach a first sign portion to a second sign portion and/or to secure a first and second sign portion in an open and/or a closed position in accordance with various embodiments of the present disclosure. However, a safety sign in accordance with the present disclosure need not comprise multiple sign portions, and nothing in the present disclosure should be interpreted to prohibit inclusion of a unitary humanoid profile safety sign in a safety sign system. In various embodiments, a humanoid profile safety sign such as sign 101 can have a unitary construction.

Humanoid profile safety sign 101 can be secured to support arm 102 using attachment component 103. In various embodiments, attachment component 103 can comprise, for example, a threaded bolt or nut configured to threadedly engage a corresponding receiving component 114, such as a nut or bolt configure to reversibly mate with attachment component 103. Attachment component 103 can further comprise a handle attached for convenient operation of the attachment component without a need for tools. Receiving component 114 can be configured as a stand-off attached to a surface of humanoid profile safety sign 101 via welds or other attachment methods. As described in more detail below, attachment component 103 and receiving component 114 can be configured to engage support arm 102 to reversibly secure humanoid profile safety sign 101 to the support arm.

Figure 2:
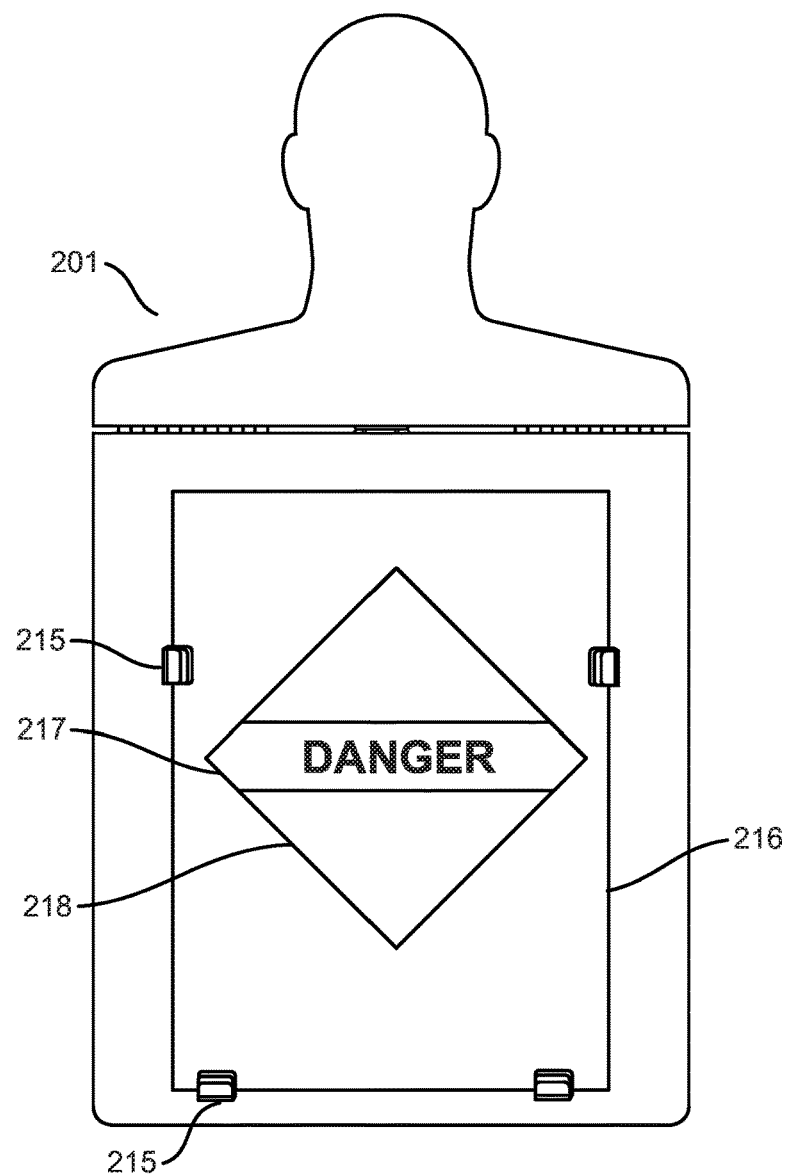
FIG. 2 illustrates a front view of a system in accordance with various embodiments of the present disclosure.

Humanoid profile safety sign 101 can include additional features, such as shelf clips 115. With reference briefly to FIG. 2, shelf clips 215 can be configured to receive and secure a placard 216 to humanoid profile safety sign 201. Placard 216 can comprise an additional component of a safety sign system such as safety sign system 200. Placard 216 and/or humanoid profile safety sign 201 can feature additional information or visual cues in the form of lettering, symbols, and the like to enhance visibility of the sign and enhance an ability to elicit an appropriate response from persons or vehicle operators in the viewing area of the sign.

A safety sign system such as system 200 can comprise features such as a reflective surface feature or a light source. A reflective surface feature can comprise, for example, wide angle prismatic lens reflective sheeting, glass bead lenses, and the like that may enhance daytime and/or nighttime sign visibility. In various embodiments, a safety sign system can comprise a plurality of reflective surface features. The reflective surface features can comprise a plurality of reflective surface features and/or surface feature colors. The reflective surface features can comprise a reflective surface area, and one or more reflective surface features can contribute to a total reflective surface area of a safety sign system. For example, placard 216 can comprise a first reflective surface feature 217 having a first color and a second reflective feature 218 having a second color. A reflective surface feature such as reflective sheeting can be applied to a safety sign system using, for example, an adhesive backing. Use of this format of reflective surface feature may conveniently provide for a wide range of customizable safety sign system appearances as well as a durable finish resistant to the elements and to wear and tear from extensive handling. In various embodiments, reflective sheeting in different colors may be configured to resemble the appearance of a human figure, such as by use of different colors and configurations of sheeting to provide the appearance of a hat, vest, reflective stripes, flag, etc. (see, e.g., FIGS. 6 and 7). In various embodiments, a safety sign system comprising a light source can comprise, for example, an LED light source, a strobe light, or other light source. A light source can be configured around the edges of humanoid profile safety sign 201 to define the humanoid profile of the sign to a person in the viewing area of the sign in darkened viewing conditions. A light source can be configured to provide a temporally changing pattern of illumination providing an illusion of human movement, such as an illusion of a person waving an arm, a flag, a flashlight, etc.

In various embodiments, safety sign systems may be provided in a range of different sizes that provide different surface areas of humanoid profile safety sign and placard, as applicable. For example, a small system could hold a placard with a surface area of about 200 square inches in an overall humanoid profile safety sign surface area of about 350 square inches, a medium system could hold a placard with a surface area of about 280 square inches in an overall humanoid profile safety sign surface area of about 520 square inches, and a large system could hold a placard with a surface area of about 380 square inches in an overall humanoid profile safety sign surface area of about 840 square inches. The foregoing example and dimensions provided are merely exemplary and should not be interpreted as limiting, and other sizes of placard and humanoid profile safety sign and relationships of placard square area to overall humanoid profile safety sign area are possible within the scope of the present disclosure. Similarly, in various embodiments, the total reflective surface area of a safety sign system may comprise various proportions of an overall humanoid profile safety sign surface area, with the total reflective surface area contributed by a humanoid profile safety sign, a placard, or both. In various embodiments, the total reflective surface area can comprise about 20%, about 30%, about 40%, about 50%, about 60%, about 70%, about 80%, about 90%, or about 100% of an overall humanoid profile safety sign surface area.

With reference again to FIGS. 1A-1C, support arm 102 of safety sign system 100 can comprise various features to facilitate deploying humanoid profile safety sign 101. In various embodiments, support arm 102 can comprise a tube having walls defining a square or rectangular cross section. Support arm 102 can further comprise one or more pairs of corresponding apertures through opposing walls of the tube, with the corresponding apertures configured to receive attachment component 103 and/or receiving component 114. For example, support arm 102 can comprise a pair of elongated slots 120. Slots 120 may be configured to receive attachment component 103 and receiving component 114 and permit humanoid profile safety sign 101 to be adjustably secured to support arm 102. In various embodiments, a support arm can be configured to provide an adjustable length, for example, via a telescoping mechanism such as a plurality of nested support arms whose positions relative to one another may be adjusted and secured in various positions to provide a plurality of overall support arm lengths. Support arm 102 can comprise a lanyard tab 121. Lanyard tab 121 can include an aperture for insertion of a lanyard. Lanyard tab 121 can also serve as a shelf bracket providing a rest or positive stop at the bottom edge of humanoid profile safety sign 101. A lower end of support arm 102 can also be configured to receive or be received by support arm bracket 104, and can include corresponding pairs of apertures 122 configured to receive support arm pin 105 used to secure support arm 102 to support arm bracket 104.

Figure 3A:
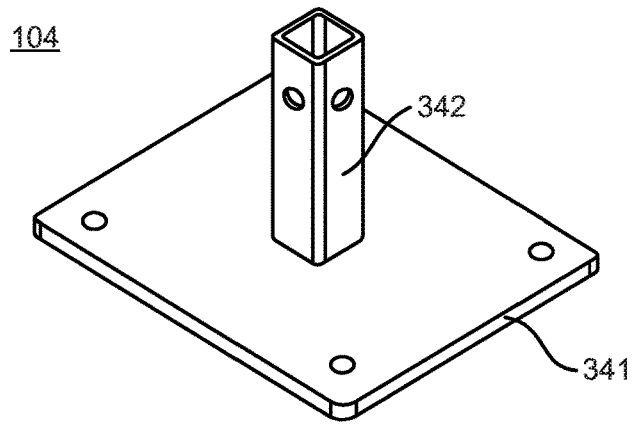
FIGS. 3A and 3B illustrate views of support arm brackets in accordance with various embodiments of the present disclosure.

As illustrated in FIG. 1C and FIG. 3A, support arm bracket 104 can be configured as a plate 341 attached to an attachment portion 342 with a size and profile configured to be received by the lower end of support arm 102. In various embodiments, an attachment portion may be configured to receive or otherwise connect to a lower end of a support arm of a safety sign system. A support arm bracket can also be configured to be at least one of permanently or removably attached to a vehicle. For example, support arm bracket 104 can be attached to a vehicle platform such as a truck bed, bumper, frame or the like by welding, bolting, or otherwise permanently or removably attaching plate 341 to the vehicle platform.

Figure 3B:
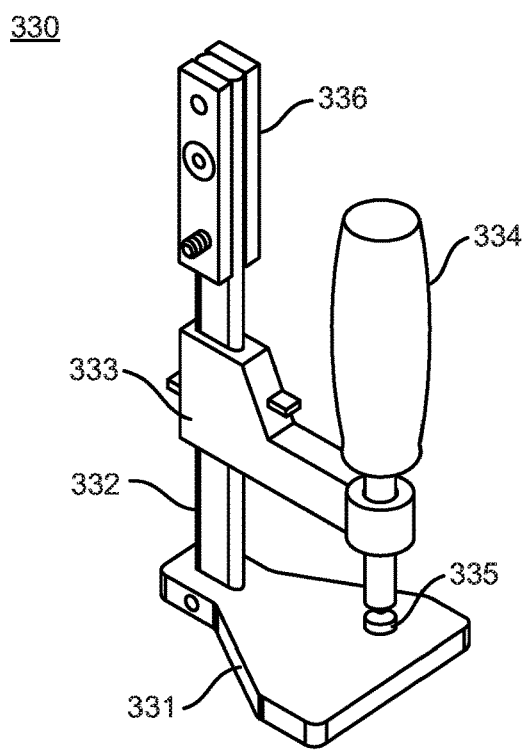

In accordance with the present disclosure, a support arm bracket can have a variety of configurations suitable to secure a safety sign system to a vehicle to provide various deployment options. For example, in various embodiments and with reference to FIG. 3B, a support arm bracket can comprise a clamp system 330. Clamp system 330 includes a fixed plate 331, a support bar 332 attached to fixed plate 331 at or near an end of support bar 332, and an adjustable arm 333 slidably attached to support bar 332 and supporting clamp handle 334 and clamp pad 335. Clamp system 330 can be removably attached to an edge of a vehicle by sliding adjustable arm 333 to close clamp system 330 around the vehicle edge followed by operation of a clamp handle 334 threadedly engaged with adjustable arm 333 to secure the vehicle edge between fixed plate 331 and clamp pad 335. Support bar 332 can include an attachment portion 336 opposite the end attached to fixed plate 331, and attachment portion 336 can be configured to reversibly engage a safety sign system support arm such as support arm 102 (FIG. 1) in a manner similar to that described above for support arm bracket 104.

Figures 4A, 4B:
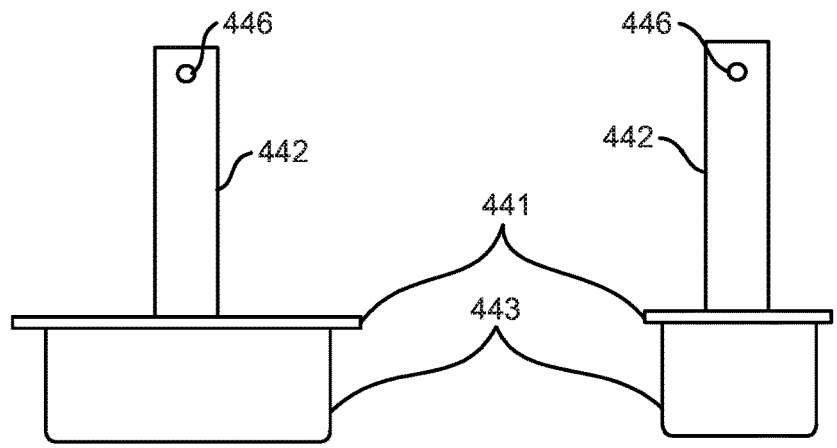
FIGS. 4A and 4B illustrate views of a support arm bracket in accordance with various embodiments of the present disclosure.

In various embodiments, a support arm bracket can have other configurations suitable to attach a safety sign system to a vehicle. For example, and with reference now to FIGS. 4A and 4B, a support arm bracket 440 can comprise a plate 441 attached to attachment portion 442 in a configuration similar to that of support arm bracket 104 described above (FIG. 1C and FIG. 3A). Support arm bracket 440 can further comprise an insertion portion 443 configured to be inserted in a stake pocket or similar receiver on a vehicle. In various embodiments, insertion portion 443 can comprise a tapered profile to facilitate alignment of insertion portion 443 with the vehicle receiver. The profile and dimensions of insertion portion 443 can be configured for convenient insertion and removal of support arm bracket 440 from a vehicle receiver without tools or fasteners (i.e., tool-less insertion) while providing for stable deployment of a safety sign system. For example, typical dimensions of a stake pocket may be about four inches (or about 3.75 inches) by about two inches (or about 1.75 inches), and dimensions of an insertion portion 443 may be about 3.5 inches by about 1.5 inches adjacent to plate 441 to provide a clearance fit in the stake pocket, while the length of the insertion portion 443 may be sufficient to prevent a deployed safety sign system from tipping, for example, about four inches. The foregoing example and dimensions provided are merely exemplary and should not be interpreted as limiting, and an insertion portion of a support arm bracket in accordance with various embodiments can have any of a number of possible configurations, dimensions, or profiles suitable to be received by a vehicle receiver while providing for support of a safety sign system.

Figures 5A, 5B:
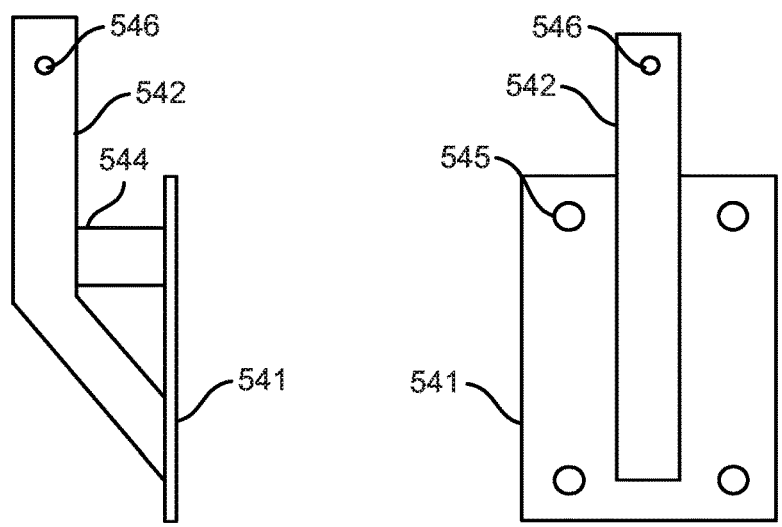
FIGS. 5A and 5B illustrate views of a support arm bracket in accordance with various embodiments of the present disclosure.

Another example of a support arm bracket in accordance with various embodiments is illustrated in FIGS. 5A and 5B. Support arm bracket 540 comprises a plate 541 and an attachment portion 542 attached to plate 541 and configured as a stand-off in a plane substantially aligned with the plane of plate 541 to permit support arm bracket 540 to be attached to a substantially vertical surface of a vehicle or trailer. Support arm bracket 540 can include a reinforcement brace 544 to stabilize a deployed safety sign system. Plate 541 can be permanently or removably mounted to a surface of vehicle or trailer such as a bumper or trailer edge, for example, by welding plate 541 or by bolting through apertures 545. In various embodiments, a support arm bracket may be slidably attached to a vehicle, such as by sliding plate 541 into a bracket configured to slidably receive plate 541 (i.e., tool-less insertion).

Any configuration of a support arm bracket that may be conceived by a person of ordinary skill in the art may be used in accordance with various embodiments to provide for modular attachment or deployment of a safety sign system from a truck, trailer, or other vehicle. In various embodiments, a safety sign system can comprise a plurality of interchangeable support arm brackets. A support arm bracket may be selected from a plurality of support arm brackets in response to a vehicle configuration to provide the most convenient or appropriate support arm bracket attachment and/or safety sign system deployment options for a particular vehicle.

In use, a safety sign system in accordance with various embodiments may be removably deployed on a truck, trailer, or other vehicle. For example, a safety sign system may be deployed at the rear of a vehicle that may be stopped near a roadway with traffic approaching from the rear. In various embodiments and with reference to FIG. 6, a safety sign system 600 can be deployed at the rear of a vehicle such as trailer 650 of a tractor-trailer vehicle. Safety sign system 600 can include a support arm bracket 604 that may be permanently or removably attached to trailer 650, such as near a rear, driver's side corner of trailer 650. After stopping, a driver or operator can deploy the remainder of safety sign system 600 by inserting support arm 602 into support arm bracket 604, and attaching humanoid profile safety sign 601 to support arm 602. Support arm 602 can be secured to support arm bracket 604 with a support arm pin such as support arm pin 105 (FIGS. 1A-1C) or other attachment device, and humanoid profile safety sign 601 can be secured to support arm 502 using an attachment component such as attachment component 103 (FIGS. 1B and 1C). Alternatively, a safety sign system can be attached to a vehicle using a support arm bracket such as clamp system 330 (FIG. 3A). Clamp system 330 (FIG. 3), support arm bracket 440 (FIGS. 4A and 4B) or a similar support arm bracket may be configured to provide convenient attachment and removal to a vehicle and deployment of a safety sign system at a number of locations around at truck. Such flexible deployment options may permit a driver or operator to achieve optimal notice to nearby persons and vehicle operators in a variety of situations with operator activity and nearby traffic in different locations with respect to the vehicle the safety sign system is deployed on.

Other safety sign system and deployment configurations are possible within the scope of the present disclosure. For example and with reference to FIG. 7, a safety sign system 700 can include an extension arm 760 configured to extend the entire humanoid profile safety sign 701 outside of an area bounded by vertical planes defined by edges of a vehicle. Such a configuration may further enhance the visibility of the safety humanoid profile safety sign 701 and impose a physical obstacle to a nearby vehicle approaching vehicle 750 too closely for the safety of a driver or operator of vehicle 750. Moreover, such a configuration could provide a driver or operator with audible feedback of any nearby vehicle approaching too closely and impacting the humanoid profile safety sign 701. In various embodiments, a safety sign system such as system 700 can be configured so that the lateral edge of safety sign 701 located furthest from vehicle 750 is at least about 6 inches, or at least about 12 inches, or at least about 18 inches, or at least about 24 inches, or at least about 30 inches, or at least about 36 inches from the nearest surface of vehicle 750. In various embodiments, a safety sign system can comprise a support arm configured to provide an adjustable length, such as via a telescoping mechanism, to provide a range of system deployment options. In various embodiments, a safety sign system can comprise a plurality of interchangeable support arms having different lengths to similarly provide a range of system deployment options. Other system configurations and deployment methods now known to or hereinafter devised by a person of skill in the art and suitable to achieve comparable deployed safety sign configurations, such as system configurations that permit a support arm and/or safety sign system to be swung or folded from beneath a truck or trailer, may be included within the scope of the present disclosure.

A humanoid profile safety sign may be constructed out of any suitable material, including, for example, 6061-T6 aluminum alloy in various configurations including sheeting, plate, tubing, and rod. For example, 6061-T6 aluminum alloy sheeting with a nominal thickness of 0.065 inches may be used for a humanoid profile safety sign and/or a placard. Similarly, 6061-T6 aluminum alloy one inch square tubing with 0.08 inch thick walls may be used for a support arm of a safety sign system in accordance with various embodiments. Other materials and material configurations may likewise be used for a safety sign system and are within the scope of the present disclosure.

In various embodiments, a safety sign system disclosed herein may provide for increased safety compared to pylons and traditional signs and achieve a level of nearby vehicle operator awareness similar to that achieved by a human flagger, in an area in which the system is deployed. This may be due in part to the increased height and/or visual cues that a human profile may provoke in nearby vehicle operators as compared to traditional signage, with nearby vehicle operators being more attuned to the presence of a human than to a sign alone.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A safety sign system comprising:
   a humanoid profile safety sign;
   a support arm, wherein the support arm comprises a tube with walls defining a rectangular cross section, and wherein the tube comprises a pair of elongated slots in opposing walls;
   an attachment component configured to attach the humanoid profile safety sign to the support arm;
   a support arm bracket configured to receive the support arm; and
   a support arm pin configured to secure the support arm to the support arm bracket.

2. The safety sign system of claim 1, wherein the pair of elongated slots is configured to receive the attachment component.

3. The safety sign system of claim 1, wherein the humanoid profile safety sign comprises a first sign portion and a second sign portion coupled to the first sign portion.

4. The safety sign system of claim 3, wherein the first sign portion and the second sign portion are coupled with a hinge, and wherein operation of the hinge can reversibly produce a change of sign configuration between a first sign configuration and a second sign configuration.

5. The safety sign system of claim 4, wherein the humanoid profile safety sign can be reversibly secured in one of the first sign configuration and the second sign configuration.

6. The safety sign system of claim 1, wherein humanoid profile safety sign comprises a profile of an anterior-posterior view of a human head and torso.

7. The safety sign system of claim 6, wherein the humanoid profile safety sign comprises a reflective surface feature.

8. The safety sign system of claim 7, wherein the reflective surface feature is one of a wide angle prismatic lens reflective sheeting and a glass bead lens.

9. The safety sign system of claim 7, wherein the humanoid profile safety sign comprises a plurality of reflective surface features.

10. The safety sign system of claim 9, wherein the plurality of reflective surface features comprises two or more colors.

11. The safety sign system of claim 8, further comprising an LED light source.

12. The safety sign system of claim 1, wherein the support arm bracket is selected from a plurality of interchangeable support arm brackets.

13. The safety sign system of claim 1, wherein the support arm bracket is configured to be one of permanently or removably attached to a vehicle.

14. The safety sign system of claim 12, wherein the plurality of interchangeable support arm brackets is configured to provide for attachment to a vehicle by an attachment method selected from the group consisting of welding, bolting, and tool-less insertion.

* * * * *